United States Patent
Shanmugavel

(10) Patent No.: US 12,413,571 B2
(45) Date of Patent: Sep. 9, 2025

(54) SYSTEM AND METHOD FOR SECURING AND RESOLVING INTERNET PROTOCOL ADDRESS

(71) Applicant: Bharanishunkkar Shanmugavel, Bangalore (IN)

(72) Inventor: Bharanishunkkar Shanmugavel, Bangalore (IN)

(73) Assignee: Bharanishunkkar Shanmugavel (IN)

( * ) Notice: Subject to any disclaimer, the term of this patent is extended or adjusted under 35 U.S.C. 154(b) by 176 days.

(21) Appl. No.: 18/039,977

(22) PCT Filed: Jan. 18, 2021

(86) PCT No.: PCT/IB2021/050337
§ 371 (c)(1),
(2) Date: Jun. 2, 2023

(87) PCT Pub. No.: WO2022/118082
PCT Pub. Date: Jun. 9, 2022

(65) Prior Publication Data
US 2024/0007453 A1    Jan. 4, 2024

(30) Foreign Application Priority Data
Dec. 3, 2020  (IN) .............. 202041052708

(51) Int. Cl.
*H04L 9/40* (2022.01)
*H04L 61/4511* (2022.01)

(52) U.S. Cl.
CPC ...... *H04L 63/0823* (2013.01); *H04L 61/4511* (2022.05)

(58) Field of Classification Search
CPC ... H04L 63/0823; H04L 61/4511; H04L 63/04
See application file for complete search history.

(56) References Cited

U.S. PATENT DOCUMENTS 7,512,974 B2 * 3/2009 Callaghan ........... H04L 63/0823
            713/157
7,634,811 B1 * 12/2009 Kienzle .................. G06F 21/33
            726/22

(Continued)

*Primary Examiner* — Jimmy H Tran
(74) *Attorney, Agent, or Firm* — Jason C. Cameron

(57) ABSTRACT

System and method for securing and resolving the IP address is disclosed. The method includes modifying an SSL certificate. Modifying the SSL certificate includes receiving one or more IP addresses, registering the SSL certificate for the received IP addresses, embedding the SSL certificate with the IP addresses, validating an embedded SSL certificate with the IP addresses, storing a validated SSL certificate. The method also includes resolving the IP addresses of the domain. Resolving the IP addresses includes receiving a query, translating the query received by the client, encrypting a translated query and transmitting an encrypted query. The method also includes integrating one or more service providers on the platform. Integrating one or more service providers includes registering the one or more service providers, sharing the database comprising the validated SSL certificate with the one or more service providers on the platform for resolving the IP addresses.

9 Claims, 9 Drawing Sheets

(56) References Cited

U.S. PATENT DOCUMENTS

| | | | |
|---|---|---|---|
| 8,738,902 B2* | 5/2014 | Yoo | H04L 61/45 726/10 |
| 9,906,503 B1* | 2/2018 | Thayer | H04L 63/166 |
| 10,511,448 B1* | 12/2019 | Brinskelle | H04L 63/166 |
| 2003/0021417 A1* | 1/2003 | Vasic | H04L 9/3263 713/155 |
| 2003/0041091 A1* | 2/2003 | Cheline | H04L 61/4511 709/200 |
| 2003/0041136 A1* | 2/2003 | Cheline | H04L 67/14 726/15 |
| 2003/0055990 A1* | 3/2003 | Cheline | H04L 63/0272 709/229 |
| 2004/0030887 A1* | 2/2004 | Harrisville-Wolff | H04L 63/08 713/155 |
| 2005/0081026 A1* | 4/2005 | Thornton | H04L 63/0823 726/4 |
| 2005/0144463 A1* | 6/2005 | Rossebo | H04L 63/0815 713/185 |
| 2006/0075219 A1* | 4/2006 | Callaghan | H04L 63/166 713/156 |
| 2006/0143442 A1* | 6/2006 | Smith | H04L 9/3271 713/156 |
| 2006/0143700 A1* | 6/2006 | Herrmann | H04L 63/166 726/14 |
| 2006/0200487 A1* | 9/2006 | Adelman | H04L 65/1079 707/999.102 |
| 2009/0119192 A1* | 5/2009 | Munoz Soro | G06Q 30/06 705/30 |
| 2011/0154018 A1* | 6/2011 | Edstrom | H04L 67/566 713/151 |
| 2011/0154026 A1* | 6/2011 | Edstrom | H04L 63/166 713/158 |
| 2012/0198511 A1* | 8/2012 | Sarferaz | G06F 21/00 726/1 |
| 2012/0204032 A1* | 8/2012 | Wilkins | H04L 63/0428 713/170 |
| 2013/0031356 A1* | 1/2013 | Prince | H04L 63/1441 713/168 |
| 2013/0081129 A1* | 3/2013 | Niemela | H04L 63/0236 726/22 |
| 2013/0138952 A1* | 5/2013 | Berggren | H04L 9/0891 713/156 |
| 2013/0198511 A1* | 8/2013 | Yoo | H04L 63/0823 713/156 |
| 2014/0373097 A1* | 12/2014 | Thayer | H04L 63/1441 726/4 |
| 2014/0373127 A1* | 12/2014 | Thayer | H04L 63/168 726/10 |
| 2015/0113172 A1* | 4/2015 | Johnson | H04L 67/75 709/245 |
| 2015/0121078 A1* | 4/2015 | Fu | H04L 9/3263 713/175 |
| 2016/0352870 A1* | 12/2016 | Manapragada | G06F 13/4282 |
| 2017/0126664 A1 | 5/2017 | Khandelwal et al. | |
| 2017/0230355 A1* | 8/2017 | Su | H04L 63/0435 |
| 2017/0250978 A1* | 8/2017 | Wang | H04L 63/0823 |
| 2018/0007021 A1* | 1/2018 | Deriso | H04L 63/0442 |
| 2018/0131521 A1* | 5/2018 | Yang | H04L 9/3265 |
| 2018/0288062 A1* | 10/2018 | Goyal | H04L 63/0281 |
| 2018/0332003 A1* | 11/2018 | Deriso | H04L 63/0823 |
| 2018/0349875 A1* | 12/2018 | Barnett | H04L 69/169 |
| 2018/0367530 A1* | 12/2018 | Mistry | H04L 63/0823 |
| 2019/0116153 A1* | 4/2019 | Deverakonda Venkata | H04L 9/3268 |
| 2019/0165950 A1* | 5/2019 | Ibrahim | H04L 9/3268 |
| 2020/0021446 A1* | 1/2020 | Roennow | H04L 9/0819 |
| 2020/0204527 A1* | 6/2020 | Vass | H04L 63/0428 |
| 2020/0267184 A1* | 8/2020 | Vera-Schockner | H04L 69/321 |
| 2020/0313929 A1* | 10/2020 | Rudnik | H04L 61/4511 |
| 2020/0403811 A1* | 12/2020 | Pavlou | H04L 63/166 |
| 2020/0412551 A1* | 12/2020 | Gero | H04L 9/3013 |
| 2021/0392111 A1* | 12/2021 | Sole | H04L 63/1416 |
| 2022/0006656 A1* | 1/2022 | Hunt | H04L 63/0823 |
| 2022/0052859 A1* | 2/2022 | Marzorati | H04L 63/0428 |
| 2022/0329442 A1* | 10/2022 | Bulusu | H04L 63/0823 |
| 2023/0308293 A1* | 9/2023 | Pergament | H04L 63/0428 |
| 2023/0308477 A1* | 9/2023 | Wyatt | H04L 63/1466 |

* cited by examiner

SYSTEM AND METHOD FOR SECURING AND RESOLVING INTERNET PROTOCOL ADDRESS

This International Application claims priority from a Patent application filed in India having Patent Application No. 202041052708, filed on Dec. 3, 2020, and titled "SYSTEM AND METHOD FOR SECURING AND RESOLVING INTERNET PROTOCOL ADDRESS".

FIELD OF INVENTION

Embodiments of a present invention relate to resolving an IP address, and more particularly, to a system and method for securing and resolving the IP address.

BACKGROUND

An Internet Protocol address (IP address) is defined as a numerical label assigned to each device connected to a computer network that uses an Internet Protocol for communication. With these communications, resolving the IP address is an important process. Resolving the IP address is a process for discovering a link layer address of a host server. The existing methods for resolving public IP address are done using Internet Service Provider (ISP) and Domain Name System (DNS). The end users in the existing setup have to depend on ISP and public DNS providers for name resolution. Here, the end user privacy may be compromised. Currently the resolution is not secured or encrypted. Resolution happens at the lower layers of TCP/IP protocol that may involve operating system which may not be required, end users cannot have an agreement with the service providers and cannot buy the service.

Hence there is a need for an improved system and method for securing and resolving the IP address to address the aforementioned issues.

BRIEF DESCRIPTION

In accordance with one embodiment of the disclosure, a method for securing and resolving one or more internet protocol (IP) addresses is disclosed. The method includes modifying a secure socket layer (SSL) certificate. Modifying the SSL certificate includes receiving the one or more internet protocol (IP) addresses of a domain associated with a user. Modifying the SSL certificate also includes registering the secure socket layer (SSL) certificate for the received one or more internet protocol (IP) addresses on a platform from the user. Modifying the SSL certificate also includes embedding the secure socket layer (SSL) certificate with the one or more internet protocol (IP) addresses of the domain. Modifying the SSL certificate also includes validating an embedded secure socket layer (SSL) certificate with the one or more internet protocol (IP) addresses. Modifying the SSL certificate also includes storing a validated secure socket layer (SSL) certificate in a database, wherein the secure socket layer (SSL) certificate is modified by integrating the one or more internet protocol (IP) addresses of the domain associated with the user.

The method also includes resolving the one or more internet protocol (IP) addresses of the domain. Resolving the one or more IP addresses includes receiving a query representative of one or the secure socket layer (SSL) certificate, the one or more internet protocol (IP) addresses, the domain, or a combination thereof from a client for adding the secure socket layer (SSL) certificate to a client server. Resolving the one or more IP addresses also includes translating the query received by the client. Resolving the one or more IP addresses also includes encrypting a translated query for securing the one or more internet protocol (IP) addresses. Resolving the one or more IP addresses also includes transmitting an encrypted query to the client server.

The method also includes integrating one or more service providers on the platform. Integrating one or more service providers includes registering the one or more service providers on the platform. Integrating one or more service providers also includes sharing the database comprising the validated secure socket layer (SSL) certificate with the one or more service providers on the platform for resolving the one or more internet protocol (IP) addresses of the domain of the user.

In accordance of another embodiment, a system to secure and resolve one or more internet protocol (IP) addresses is disclosed. The system includes one or more processors. The processor includes a certificate modification module which includes an input module configured to receive the one or more internet protocol (IP) addresses of a domain associated with a user. The certificate modification module also includes a registration module configured to register the secure socket layer (SSL) certificate for the received one or more internet protocol (IP) addresses on a platform from the user. The certificate modification module also includes a certificate embedding module configured to embed the secure socket layer (SSL) certificate with the one or more internet protocol (IP) addresses of the domain. The certificate modification module also includes a certificate validation module configured to validate an embedded secure socket layer (SSL) certificate with the one or more internet protocol (IP) addresses. The certificate modification module also includes a certificate storage module configured to store a validated secure socket layer (SSL) certificate in a database, wherein the secure socket layer (SSL) certificate is modified by integrating the one or more internet protocol (IP) addresses of the domain associated with the use.

The processor also includes an IP resolution module operatively coupled to the certificate modification module. The IP resolution module includes a query module configured to receive a query representative of one or the secure socket layer (SSL) certificate, the one or more internet protocol (IP) addresses, the domain, or a combination thereof from a client for adding the secure socket layer (SSL) certificate to a client server. The IP resolution module also includes a query translation module configured to translate the query received by the client. The IP resolution module also includes a query encryption module configured to encrypt a translated query for securing the one or more internet protocol (IP) addresses. The IP resolution module also includes a query transmission module configured to transmit an encrypted query to the client server.

The processor also includes an integration module operatively coupled to the IP resolution module. The integration module includes a service provider registration module configured to register the one or more service providers on the platform. The integration module also includes a certificate sharing module configured to share the database comprising the validated secure socket layer (SSL) certificate with the one or more service providers on the platform to resolve the one or more internet protocol (IP) addresses of the domain of the user.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
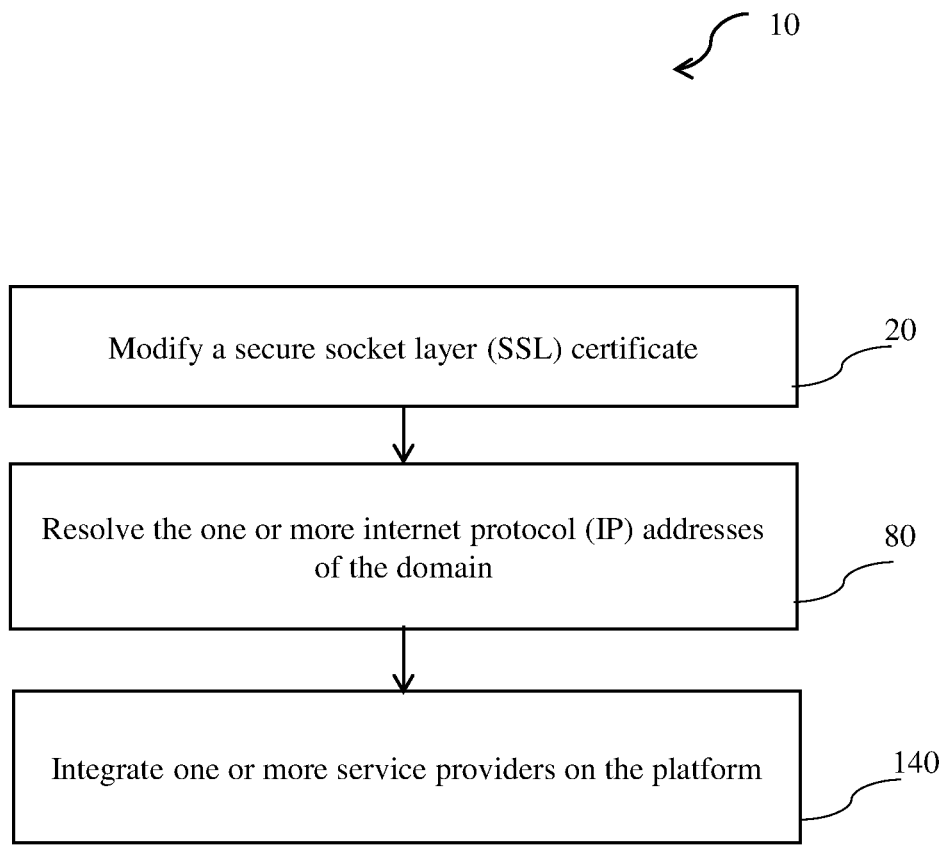
FIG. 1 is a flow chart representing steps involved in a method for securing and resolving one or more internet protocol (IP) addresses in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and method for securing and resolving one or more internet protocol (IP) addresses. As used herein, the term "IP address" is defined as a numerical label assigned to each device connected to a computer network that uses an Internet Protocol for communication. Also, the term 'internet protocol' is defined as a set of rules governing the format of data sent over the Internet or other network.

Turning to FIG. 1 which is a flow chart representing steps involved in a method (10) for securing and resolving one or more internet protocol (IP) addresses in accordance with an embodiment of the present disclosure. The method (10) includes modifying a secure socket layer (SSL) certificate in step 20. As used herein, the term 'SSL certificate' may be defined as a small data file installed on a Web server that allows for a secure connection between the server and a Web browser. Also, SSL certificate is a certification for the security of any domain or the IP addresses. As used herein, the term 'domain' may be defined as a name given to identify the one or more IP addresses. The domain is linked with the one or more IP addresses. In one embodiment, a domain name system (DNS) server may be required to convert the domain name into the corresponding one or more IP addresses.

Figure 2:
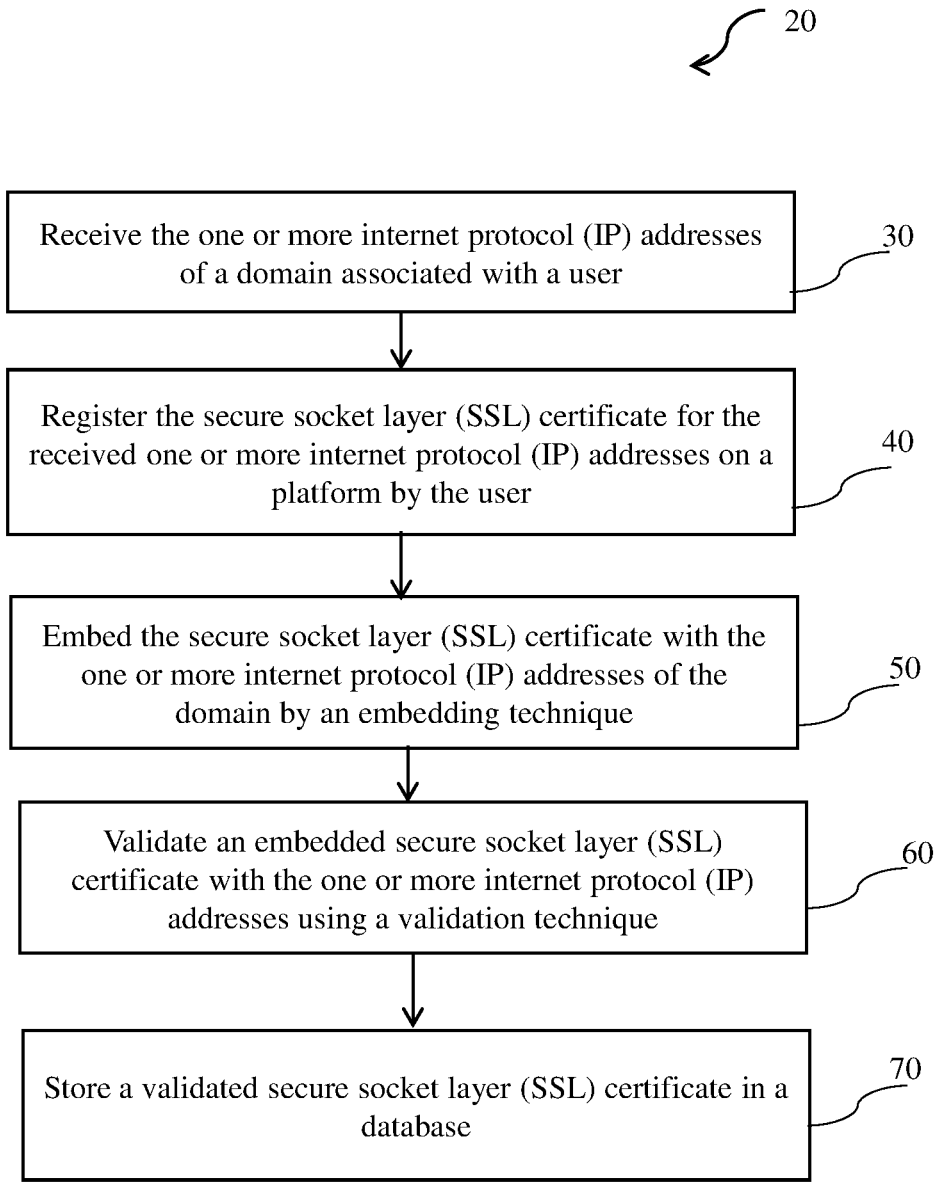
FIG. 2 is a flow chart representing steps involved in a method for modifying a secure socket layer (SSL) certificate of FIG. 1 in accordance with an embodiment of the present disclosure.

Further, modifying the SSL certificate includes (as shown in FIG. 2) receiving the one or more internet protocol (IP) addresses of a domain associated with a user in step 30. In one embodiment, receiving the one or more IP addresses may include receiving the one or more IP addresses by an input module of a certification module. In one exemplary embodiment, receiving the one or more IP addresses may include receiving the one or more IP addresses associated to a domain of a user. In such embodiment, receiving the one or more IP addresses may include receiving IP addresses such as IPV4, IPV6 of the like wherein the IPV4 and IPV6 are the IP address of version 4 and version 6 respectively of the same domain.

Modifying the SSL certificate also includes registering the secure socket layer (SSL) certificate for the received one or more internet protocol (IP) addresses on a platform from the user in step 40. In one embodiment, registering the SSL certificate may include registering the SSL certificate by a registration module. In such embodiment, registering the SSL certificate may include registering the SSL certificate based on the one or more IP addresses received. In one exemplar embodiment, the platform may be one of a centralised platform or a decentralised platform.

Furthermore, modifying the SSL certificate also includes embedding the secure socket layer (SSL) certificate with the one or more internet protocol (IP) addresses of the domain by an embedding technique in step 50. More specifically, upon registering the SSL certificate of a domain of a user, the same is embedded with the SSL certificate with the one or more IP addresses and the domain of the user. In one embodiment, embedding the SSL certificate may include embedding the SSL certificate by a certificate embedding module. In one exemplary embodiment, embedding the secure socket layer (SSL) certificate with the one or more internet protocol (IP) addresses of the domain may include embedding the secure socket layer (SSL) certificate with the one or more internet protocol (IP) addresses of a host associated to a web platform. In one embodiment, the platform may be associated to Service Providers such as but not limited to SSL Service Providers on the Internet hosting the modified SSL certificates and agree to share or buy or sell IP domain information for the service providers themselves and for the end users in one of an encrypted fashion or without encryption or by using the methods described in the disclosure.

Modifying the SSL certificate also includes validating an embedded secure socket layer (SSL) certificate with the one or more internet protocol (IP) addresses using a validation technique in step 60. In one embodiment, validating the embedded SSL certificate may include validating the embedded SSL certificate by a certificate validation module. In one exemplary embodiment, validating the embedded SSL certificate may include validating the embedded SSL certificate by mapping one of the domain, the one or more IP addresses or a combination thereof of the user with secured reference data stored with one or more service providers. As used herein, the term "service providers" may refer to one or more entities which may be authorised to provide the SSL certificate for the corresponding one or more IP addresses for the user.

In one exemplary embodiment, the method (10) may include generating a notification based on a validity result obtained upon comparing the SSL certificate with the secured reference data. In such embodiment, the method (10) may further include generating a positive validity result or a negative validity result based on the obtained comparison result.

Furthermore, modifying the SSL certificate also includes storing a validated secure socket layer (SSL) certificate in a database in step 70. In one exemplary embodiment, storing the SSL certificate may include storing the SSL certificate by a certificate storage module. In one embodiment, storing the SSL certificate may include storing the validated SSL certificate upon receiving the positive validity result. In another embodiment, the method (10) may include discarding the validated SSL certificate upon receiving the negative validity result. Thereby, the SSL certificate is modified by integrating the one or more internet protocol (IP) addresses of the domain associated with the user.

Figure 3:
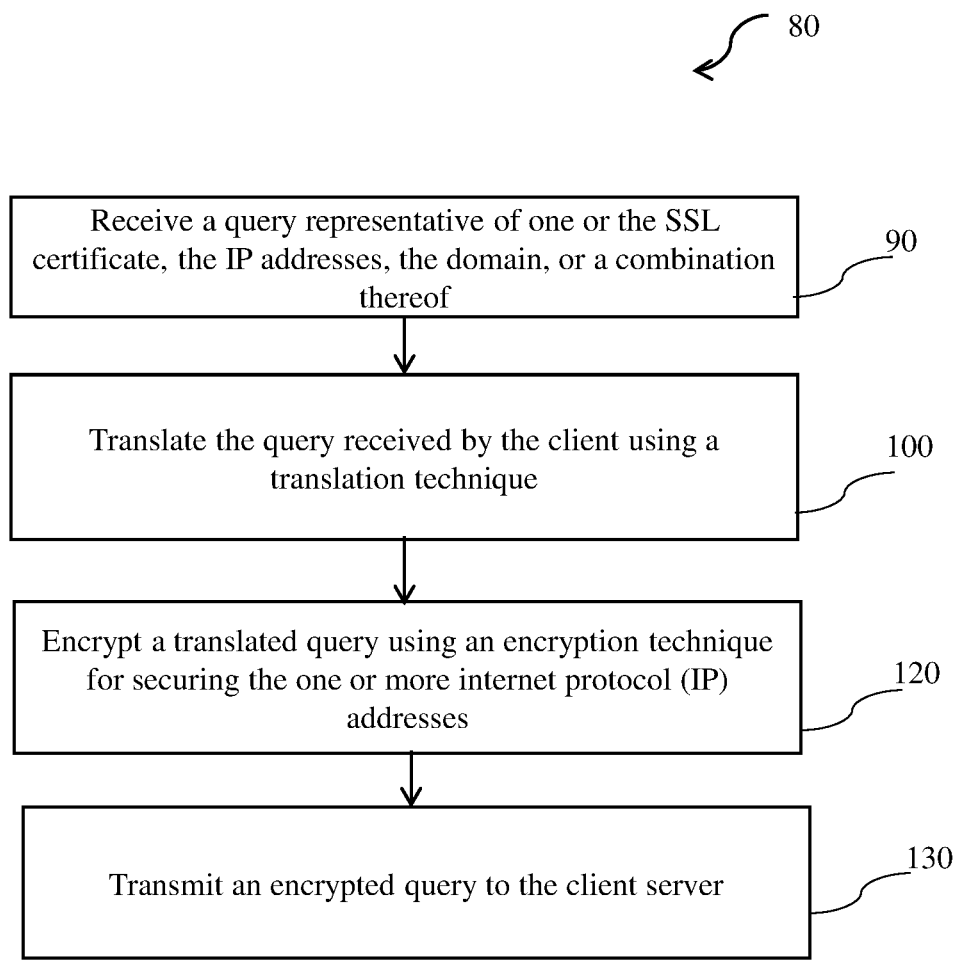
FIG. 3 is a flow chart representing steps involved in a method for resolving the one or more internet protocol (IP) addresses of the domain of FIG. 1 in accordance with an embodiment of the present disclosure.

The method (10) also includes resolving the one or more internet protocol (IP) addresses of the domain (as shown in FIG. 3) in step 80. Resolving the one or more IP addresses include receiving a query representative of one or the secure socket layer (SSL) certificate, the one or more internet protocol (IP) addresses, the domain, or a combination thereof from a client for adding the secure socket layer (SSL) certificate to a client server in step 90. In one embodiment, receiving the query may include receiving the query by a query module. In one embodiment, the client may refer to a end user, and the client server may refer to a server accessed by the client.

Furthermore, resolving the one or more IP addresses also include translating the query received by the client using a translation technique in step 100. In one embodiment, translating the query may include translating the query by a query translation module. In one exemplary embodiment, translating the query may include translating the query using the translation technique which may be user in the DNS server. In such embodiment, the translation technique may include a comparison technique, wherein the server may craw a database and may the query to fetch the associated data from the database.

In one exemplary embodiment, resolving the one or more IP addresses may also include receiving data associated with the encrypted query from the client server upon transmitting the encrypted query. More specifically, the method (10) may include receiving an encrypted query from the client server which may be encrypted using the encryption technique. In such embodiment, receiving the data may include receiving the data by a query receiving module.

Resolving the one or more IP addresses also include encrypting a translated query using an encryption technique for securing the one or more internet protocol (IP) addresses in step 120. In one embodiment, encrypting the translated query may include encrypting the translated query by a query translation module. Resolving the one or more IP addresses also include transmitting an encrypted query to the client server in step 130. More specifically, transmitting the encrypted query may include transmitting the converted and encrypted query to the client server. In one embodiment, transmitting an encrypted query to the client server may include transmitting the encrypted query by a query transmission module.

Figure 4:
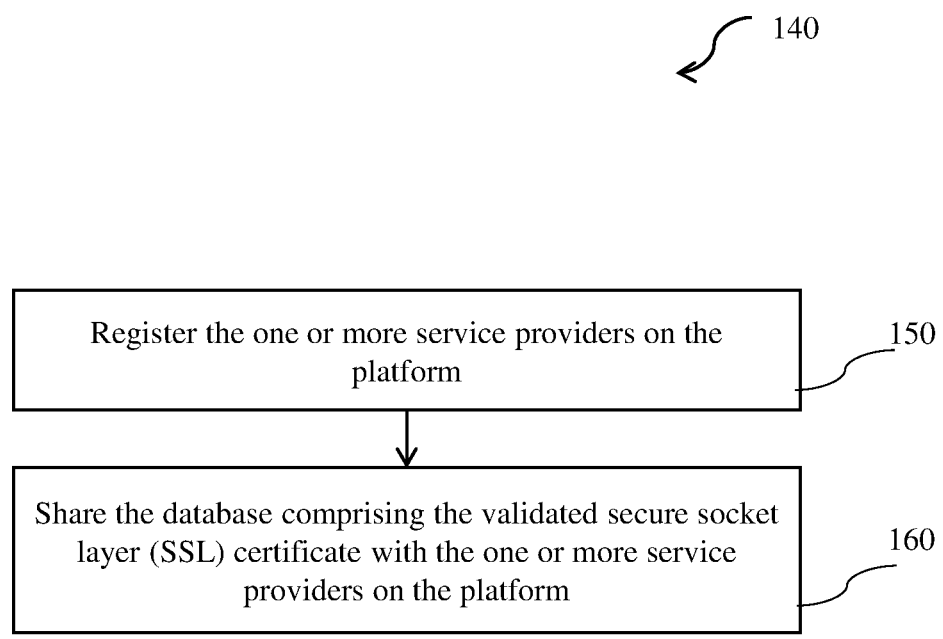
FIG. 4 is a flow chart representing steps involved in a method for integrating one or more service providers on the platform of FIG. 1 in accordance with an embodiment of the present disclosure.

Furthermore, the method (10) includes integrating one or more service providers on the platform (as shown in FIG. 4) in step 140. Integrating the one or more service providers may include registering the one or more service providers on the platform in step 150. In one embodiment, registering the one or more service providers may include registering the one or more service providers by a service provider registration module. In such embodiment, registering the one or more service providers may include registering the one or more service providers upon receiving one or more service provider data from the corresponding one or more service providers.

Integrating the one or more service providers may also include sharing the database comprising the validated secure socket layer (SSL) certificate with the one or more service providers on the platform for resolving the one or more internet protocol (IP) addresses of the domain of the user in step 160. In one embodiment, sharing the database may include sharing the database by a certificate sharing module.

In one exemplary embodiment, the method (10) may further include updating the socket layer (SSL) certificate comprising the one or more internet protocol (IP) addresses of the domain periodically. In such embodiment, updating the SSL certificate may include updating the SSL certificate by a certificate update module.

Figure 5:
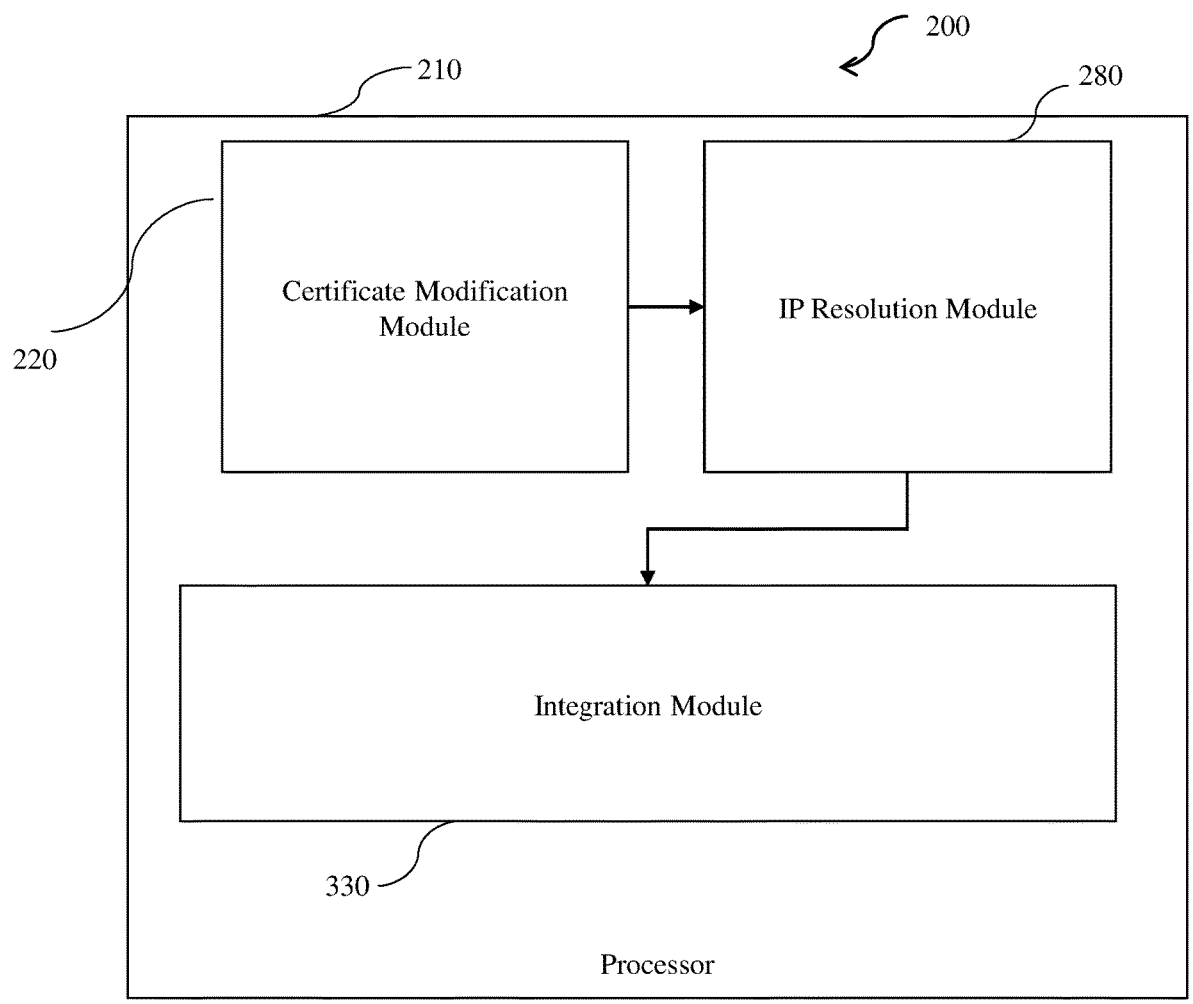
FIG. 5 is a block diagram representation of a system to secure and resolve one or more internet protocol (IP) addresses in accordance with an embodiment of the present disclosure.
Figure 6:
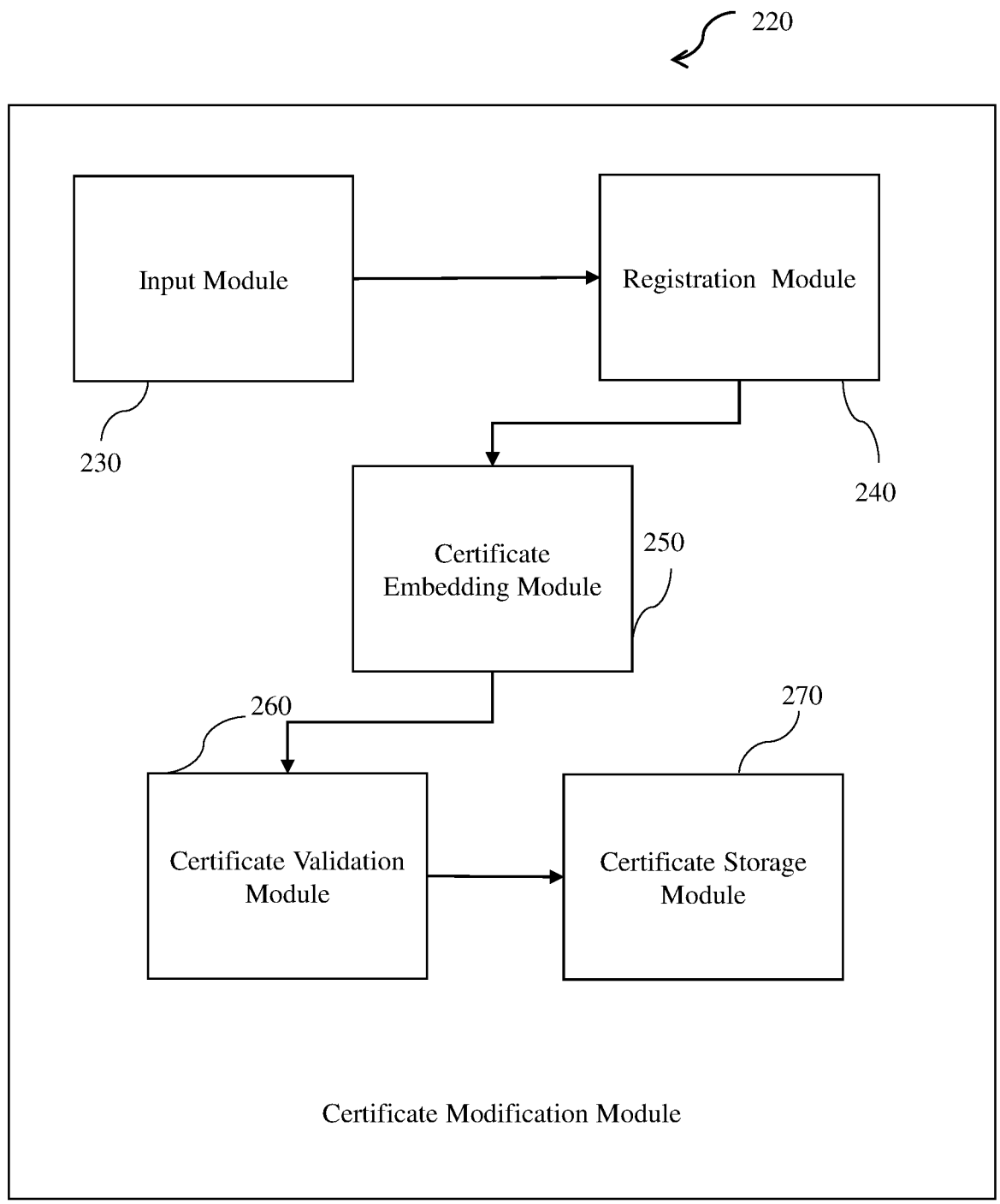
FIG. 6 is a block diagram representation of a certificate modification module of FIG. 1 in accordance with an embodiment of the present disclosure.

FIG. 5 is a block diagram representation of a system (200) to secure and resolve one or more internet protocol (IP) addresses in accordance with an embodiment of the present disclosure. The system (200) includes one or more processors (210). The processor (210) includes a certificate modification module (as shown in FIG. 6) (220) which includes an input module (230). The input module (230) is configured to receive the one or more internet protocol (IP) addresses of a domain associated with a user. In one embodiment, the input module (230) may also receive multiple data associated to one of a user, a domain or the like. The user may be associated with the domain or the one or more IP addresses.

The certificate modification module (220) also includes a registration module (240) operatively coupled to the input module (230). The registration module (240) is configured to register the secure socket layer (SSL) certificate for the received one or more internet protocol (IP) addresses on a platform from the user. In one embodiment, the registration module (240) may register the SSL certificate based on the data associated to one of a user, a domain or the like.

The certificate modification module (220) also includes a certificate embedding module (250) operatively coupled to the registration module (240). The certificate embedding module (250) is configured to embed the secure socket layer (SSL) certificate with the one or more internet protocol (IP) addresses of the domain using an embedding technique. In one embodiment, the embedding technique may be a set of rules which may be configured to operate automatically. The certificate modification module (220) also includes a certificate validation module (250) operatively coupled to the certificate embedding module (240). The certificate validation module (250) is configured to validate an embedded secure socket layer (SSL) certificate with the one or more internet protocol (IP) addresses using a validation technique. In one embodiment, the validation technique may include a comparison technique. In one embodiment, the certificate embedding module (250) may be configured to embed the secure socket layer (SSL) certificate with the one or more internet protocol (IP) addresses of a host associated to a web platform.

The certificate modification module (220) also includes a certificate storage module (270) operatively coupled to the certificate validation module (260). The certificate modification module (270) is configured to store a validated secure socket layer (SSL) certificate in a database, wherein the secure socket layer (SSL) certificate is modified by integrating the one or more internet protocol (IP) addresses of the domain associated with the use. In one embodiment, the one or more IP addresses may be integrated with the SSL certificating using an integration technique. In one exemplary embodiment, the integration technique may include a set of instruction and/or rules which may be configured to automate the system (10).

Figure 7:
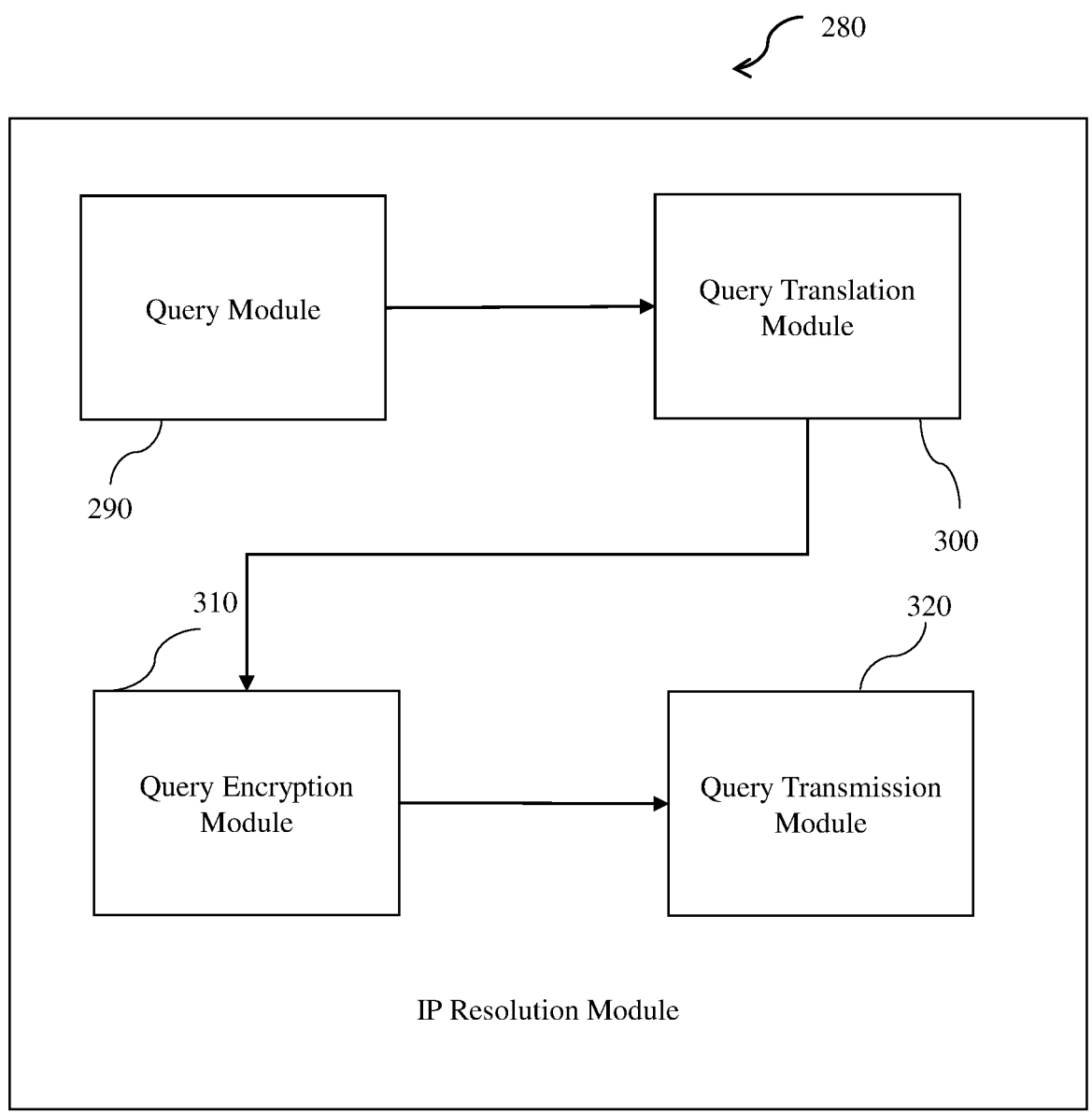
FIG. 7 is a block diagram representation of IP resolution module of FIG. 1 in accordance with an embodiment of the present disclosure.

Furthermore, the processor (210) also includes an IP resolution module (as shown in FIG. 7) (280) operatively coupled to the certificate modification module (220). The IP resolution module (280) includes a query module (290) configured to receive a query representative of one or the secure socket layer (SSL) certificate, the one or more internet protocol (IP) addresses, the domain, or a combination thereof from a client for adding the secure socket layer (SSL) certificate to a client server.

The IP resolution module (280) also includes a query translation module (300) operatively coupled to the query module (290). The query translation module (300) is configured to translate the query received by the client using a translation technique. In one embodiment, the translation technique may be a technique in a DNS server.

The IP resolution module (280) also includes a query encryption module (310) operatively coupled to the query translation module (300). The query encryption module (310) is configured to encrypt a translated query using an encryption technique for securing the one or more internet protocol (IP) addresses.

In one exemplary embodiment, the IP resolution module (280) may further include a query receiving module which may be configured to receive data associated with the encrypted query from the client server upon transmitting the encrypted query. The data received from the client server comprises an encrypted data encrypted using the encryption technique. Further, the IP resolution module (280) also includes a query transmission module (320) operatively coupled to the query encryption module (310).

The query transmission module (320) is configured to transmit an encrypted query to the client server.

Figure 8:
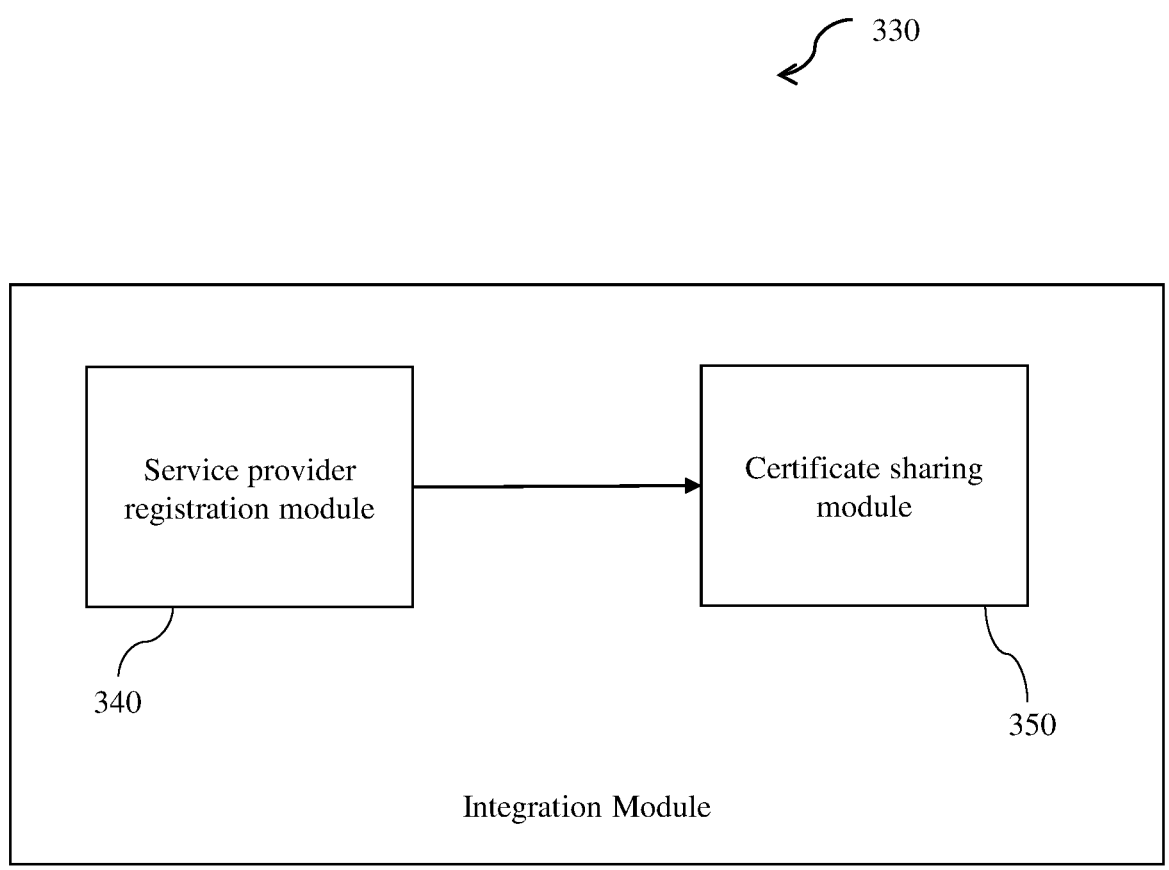
FIG. 8 is a block diagram representation of an integration module of FIG. 1 in accordance with an embodiment of the present disclosure.

The processor (210) also includes an integration module (as shown in FIG. 8) (330) operatively coupled to the IP resolution module (280). The integration module (330) includes a service provider registration module (340) configured to register the one or more service providers on the platform. In one embodiment, the platform may be a centralised platform or a decentralised platform.

The integration module (330) also includes a certificate sharing module (350) operatively coupled to the service provider registration module (340). The certificate sharing module (350) is configured to share the database comprising the validated secure socket layer (SSL) certificate with the one or more service providers on the platform to resolve the one or more internet protocol (IP) addresses of the domain of the user.

Figure 9:
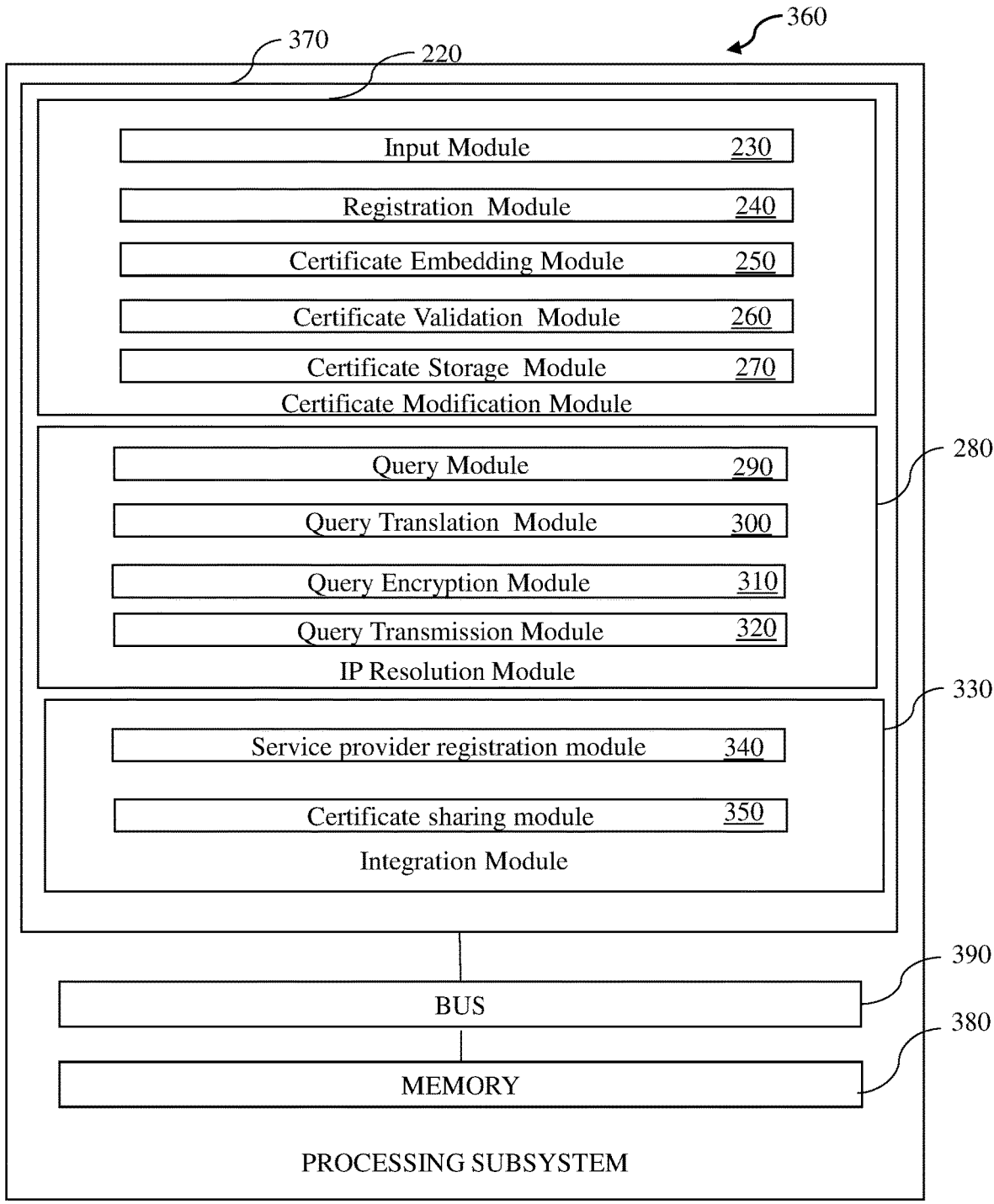
FIG. 9 is a block diagram representation of a processing subsystem located on a local server or on a remote server in accordance with an embodiment of the present disclosure.

FIG. 9 is a block diagram representation of a processing subsystem located on a local server or on a remote server in accordance with an embodiment of the present disclosure. The server (360) includes processor(s) (370), and memory (380) operatively coupled to the bus (390).

The processor(s) (370), as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory (380) includes a plurality of modules stored in the form of executable program which instructs the processor (310) to perform the method steps illustrated in FIGS. 1 to 4. The memory (380) is substantially similar to the system (200) of FIG. 5. The memory (380) has the following modules: a certificate modification module (220) comprising an input module (230), a registration module (240), a certificate embedding module (250), a certificate validation module (260), a certificate storage module (270); an IP resolution module (280) comprising a query module (290), a query translation module (300), a query encryption module (310), a query transmission module (320); an integration module (330) comprising a service provider registration module (340), a certificate sharing module (350).

The input module (230) configured to receive the one or more internet protocol (IP) addresses of a domain associated with a user. The registration module (240) configured to register the secure socket layer (SSL) certificate for the received one or more internet protocol (IP) addresses on a platform from the user. The certificate embedding module (250) configured to embed the secure socket layer (SSL) certificate with the one or more internet protocol (IP) addresses of the domain. The certificate validation module (260) configured to validate an embedded secure socket layer (SSL) certificate with the one or more internet protocol (IP) addresses. The certificate storage module (270) configured to store a validated secure socket layer (SSL) certificate in a database.

The query module (290) configured to receive a query representative of one or the secure socket layer (SSL) certificate, the one or more internet protocol (IP) addresses, the domain, or a combination thereof from a client for adding the secure socket layer (SSL) certificate to a client server. The query translation module (300) configured to translate the query received by the client. The query encryption module (310) configured to encrypt a translated query using an encryption technique for securing the one or more internet protocol (IP) addresses. The query transmission module (320) configured to transmit an encrypted query to the client server.

The service provider registration module (340) configured to register the one or more service providers on the platform. The certificate sharing module (350) configured to share the database comprising the validated secure socket layer (SSL) certificate with the one or more service providers on the platform.

Various embodiments of the present disclosure enable the system and method for securing and resolving one or more internet protocol (IP) addresses to provide a more secured way of resolving the IP addresses. The system enables the end user more privacy with respect to the domain and the IP address. The system also provides an encrypted resolution technique to enhance the security of the platform during the IP resolution. The system also eliminates the use of any operating system and/or the lower layers of TCP/IP protocol. In addition, the system provides the platform to create an agreement between multiple service providers. Also, the system can resolve the IP without the intervention of the internet service provider based on the modified SSL certificate. Also, the information from IP address to domain and domain to IP address is solved by the method While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A method (10) for securing and resolving one or more internet protocol (IP) addresses comprising: modifying, by a certificate modification module, a secure socket layer (SSL) certificate comprising: (20)
   receiving, by an input module, the one or more internet protocol (IP) addresses of a domain associated with a user; (30)
   registering, by a registration module, the secure socket layer (SSL) certificate for the received one or more internet protocol (IP) addresses on a platform from the user; (40)
   embedding, by certificate embedding module, the secure socket layer (SSL) certificate with the one or more internet protocol (IP) addresses of the domain; (50)
   validating, by a certificate validation module, an embedded secure socket layer (SSL) certificate with the one or more internet protocol (IP) addresses; (60)
   storing, by a certificate storage module, a validated secure socket layer (SSL) certificate in a database, wherein the secure socket layer (SSL) certificate is modified by integrating the one or more internet protocol (IP) addresses of the domain associated with the user; (70)
   resolving, by an IP resolution module, the one or more internet protocol (IP) addresses of the domain comprising: (80)
   receiving, by a query module, a query representative of one of the secure socket layer (SSL) certificate, the one or more internet protocol (IP) addresses, the domain, or a combination thereof from a client for adding the secure socket layer (SSL) certificate to a client server; (90)
   translating, by a query translation module, the query received by the client; (100)
   encrypting, by a query encryption module, a translated query for securing the one or more internet protocol (IP) addresses; (120)
   transmitting, by a query transmission module, an encrypted query to the client server; (130)
   integrating, by an integration module, one or more service providers on the platform comprising: (140)
   registering, by a service provider registration module, the one or more service providers on the platform; and (150)
   sharing, by a certificate sharing module, the database comprising the validated secure socket layer (SSL) certificate with the one or more service providers on the platform for resolving the one or more internet protocol (IP) addresses of the domain of the user (160).

2. The method (10) as claimed in claim 1, wherein embedding the secure socket layer (SSL) certificate with the one or more internet protocol (IP) addresses of the domain comprises embedding the secure socket layer (SSL) certificate with the one or more internet protocol (IP) addresses of a host associated to a web platform.

3. The method (10) as claimed in claim 1, wherein resolving the one or more internet protocol (IP) addresses comprises:
   receiving data associated with the encrypted query from the client server upon transmitting the encrypted query, wherein receiving the data from the client server comprises receiving the data from the client ser upon encrypting the data.

4. The method (10) as claimed in claim 1, comprising updating the socket layer (SSL) certificate comprising the one or more internet protocol (IP) addresses of the domain periodically.

5. A system (200) to secure and resolve one or more internet protocol (IP) addresses comprising:
   one or more processors (210) comprising:
   a certificate modification module (220), wherein the certificate modification module comprises:
   an input module (230) configured to receive the one or more internet protocol (IP) addresses of a domain associated with a user;

a registration module (240) operatively coupled to the input module (230), and configured to register the secure socket layer (SSL) certificate for the received one or more internet protocol (IP) addresses on a platform from the user;

a certificate embedding module (250) operatively coupled to the registration module (240), and configured to embed the secure socket layer (SSL) certificate with the one or more internet protocol (IP) addresses of the domain;

a certificate validation module (260) operatively coupled to the certificate embedding module (250), and configured to validate an embedded secure socket layer (SSL) certificate with the one or more internet protocol (IP) addresses; and a certificate storage module (270) operatively coupled to the certificate validation module (260), and configured to store a validated secure socket layer (SSL) certificate in a database, wherein the secure socket layer (SSL) certificate is modified by integrating the one or more internet protocol (IP) addresses of the domain associated with the user;

an IP resolution module (280) operatively coupled to the certificate modification module (220), wherein the IP resolution module (280) comprises:

a query module (290) configured to receive a query representative of one or the secure socket layer (SSL) certificate, the one or more internet protocol (IP) addresses, the domain, or a combination thereof from a client for adding the secure socket layer (SSL) certificate to a client server;

a query translation module (300) operatively coupled to the query module (290), and configured to translate the query received by the client;

a query encryption module (310) operatively coupled to the query translation module (300), and configured to encrypt a translated query for securing the one or more internet protocol (IP) addresses; and a query transmission module (320) operatively coupled to the query encryption module (310), and configured to transmit an encrypted query to the client server;

an integration module (330) operatively coupled to the IP resolution module (280), wherein the integration module (330) comprises:

a service provider registration module (340) configured to register the one or more service providers on the platform; and a certificate sharing module (350) operatively coupled to the service provider registration module (340), and configured to share the database comprising the validated secure socket layer (SSL) certificate with the one or more service providers on the platform to resolve the one or more internet protocol (IP) addresses of the domain of the user.

6. The system (200) as claimed in claim 5, wherein the certificate embedding module (250) is configured to embed the secure socket layer (SSL) certificate with the one or more internet protocol (IP) addresses of a host associated to a web platform.

7. The system (200) as claimed in claim 5, wherein the IP resolution module (280) comprises a query receiving module operatively coupled to the query transmission module (320), and configured to receive data associated with the encrypted query from the client server upon transmitting the encrypted query, wherein the data received from the client server comprises an encrypted data.

8. The system (200) as claimed in claim 5, comprises a certificate update module operatively coupled to the integration module (330), and configured to update the socket layer (SSL) certificate comprising the one or more internet protocol (IP) addresses of the domain periodically.

9. The system (200) as claimed in claim 5, wherein the platform is associated to Service Providers, wherein the service providers comprise SSL Service Providers on the Internet, hosting the modified SSL certificates and agree to share or buy or sell IP domain information for the service providers themselves and for the end users in one of an encrypted fashion or without encryption.

* * * * *